United States Patent
Lowell et al.

(10) Patent No.: US 11,885,922 B2
(45) Date of Patent: Jan. 30, 2024

(54) ADAPTIVE TRACKING OF GEOLOGICAL OBJECTS

(71) Applicant: Foster Findlay Associates Limited, Newcastle upon Tyne (GB)

(72) Inventors: James Lowell, Newcastle upon Tyne (GB); Dale Norton, Newcastle upon Tyne (GB)

(73) Assignee: Foster Findlay Associates Limited, Newcastle upon Tyne (GB)

( * ) Notice: Subject to any disclaimer, the term of this patent is extended or adjusted under 35 U.S.C. 154(b) by 0 days.

(21) Appl. No.: 17/708,071

(22) Filed: Mar. 30, 2022

(65) Prior Publication Data

US 2022/0260741 A1    Aug. 18, 2022

Related U.S. Application Data

(63) Continuation of application No. 16/462,111, filed as application No. PCT/GB2017/052730 on Sep. 15, 2017, now abandoned.

(30) Foreign Application Priority Data

Nov. 23, 2016 (GB) ........................ 1619782

(51) Int. Cl.
*G01V 1/30* (2006.01)
*G01V 1/34* (2006.01)

(52) U.S. Cl.
CPC .............. *G01V 1/302* (2013.01); *G01V 1/345* (2013.01); *G01V 2210/643* (2013.01)

(58) Field of Classification Search
CPC ... G01V 1/302; G01V 1/345; G01V 2210/643
See application file for complete search history.

(56) References Cited

U.S. PATENT DOCUMENTS

| 9,182,511 B2 * | 11/2015 | Neave ................. G01V 1/345 |
| 2010/0040281 A1 | 2/2010 | Chen et al. |

(Continued)

FOREIGN PATENT DOCUMENTS

| BR | 112016019718 B1 * | 11/2022 | ............. G01V 1/282 |
| GB | 2503506 A | 1/2014 | |

OTHER PUBLICATIONS

Machine Translation (English) of Chu et al. in Foreign Patent Document BR 112016019718 B1 (Year: 2015).*

(Continued)

*Primary Examiner* — Mischita L Henson
(74) *Attorney, Agent, or Firm* — Barnes & Thornburg LLP

(57) ABSTRACT

A computer-implemented method for detecting at least one natural contour of a geologic object in 3D seismic data may comprise: (a) receiving at least one first predetermined data set from said 3D seismic data comprising a plurality of phase events; (b) selecting at least one first seed phase event having a first phase characteristic from said plurality of phase events; (c) determine a characterizing score between said selected at least one first seed phase event and each one of a predetermined number of candidate phase events of said at least one first predetermined data set; (d) assigning said characterizing score to each one of said predetermined number of candidate phase events; (e) adjusting said characterizing score of at least one of said predetermined number of candidate phase events in accordance with at least one first boundary condition; (f) determining at least one natural contour between said at least one first seed phase event and at least a second phase event, utilizing an optimization algorithm; (g) generating a visual representation of said at least one natural contour within said at least one first predetermined data set.

20 Claims, 16 Drawing Sheets

(56) References Cited

U.S. PATENT DOCUMENTS

| | | |
|---|---|---|
| 2010/0149917 A1 | 6/2010 | Imhof et al. |
| 2010/0161232 A1 | 6/2010 | Chen et al. |
| 2011/0048731 A1 | 3/2011 | Imhof et al. |
| 2011/0246157 A1 | 10/2011 | Pauget et al. |
| 2011/0307178 A1 | 12/2011 | Hoekstra |
| 2014/0140580 A1 | 5/2014 | Neave |
| 2014/0214328 A1 | 7/2014 | Hauks et al. |
| 2014/0278115 A1 | 9/2014 | Bas et al. |
| 2015/0219779 A1 | 8/2015 | Deng et al. |
| 2015/0316683 A1 | 11/2015 | Purves et al. |
| 2019/0285765 A1 | 9/2019 | Lowell et al. |

OTHER PUBLICATIONS

International Search Report and Written Opinion for PCT/GB2017/052730 dated Oct. 23, 2017.
Search Report for application GB1619782.4 dated Apr. 27, 2017.
E Goldner et al., "2D Horizon Tracking Using Dynamic Programming" published 2013, SBgf, pp. 1.4.

* cited by examiner (a)

(b)

(c)

(a)

(b)

(a)

(b)

(b)

(a)

ADAPTIVE TRACKING OF GEOLOGICAL OBJECTS

CROSS REFERENCE TO RELATED APPLICATIONS

This application is a continuation of and claims priority to U.S. patent application Ser. No. 16/462,111, which was filed on May 17, 2019, as a national stage entry of PCT International Patent Application No. PCT/GB2017/052730, filed Sep. 15, 2017, which claims priority to Great Britain Patent Application No. 1619782.4, filed Nov. 23, 2016. Each of those applications is expressly incorporated herein by reference.

TECHNICAL FIELD

The present invention relates generally to the field of oil and gas exploration, and in particular to the field of computer aided exploration for hydrocarbons using geophysical data, such as for example seismic data, of the earth. Even more particular, the present invention relates to the analysis of seismic trace data, so as to allow interactive tracking of geological objects, such as horizons and faults.

INTRODUCTION

In the oil and gas industry, geological data surveys such as, for example, seismic prospecting and other similar techniques are commonly used to aid in the search for and evaluation of subterranean hydrocarbon deposits. As an example, prospecting operations include three basic stages (i) data acquisition, (ii) data processing and (iii) data interpretation. The success of the prospecting operation generally depends on satisfactory completion of (i), (ii) and (iii). For example, a seismic source is used to generate an acoustic signal that propagates into the earth and that is at least partially reflected by subsurface seismic reflectors. The reflected signals are then detected and recorded by an array of seismic receivers located at or near the surface of the earth, in an overlying body of water, or at known depths of boreholes.

FIG. 1, for example, shows a typical setup for offshore seismic surveys, where a large seismic survey vessel 10 is used to tow acoustic receivers 12, also known as streamers, suspended below the surface, which carry hydrophones (not shown). During data acquisition, sound waves 14 are transmitted from the vessel 10 using compressed air guns 16 and which travel down through the seabed and reflect back from the different layers (strata) of rock 18, 20, 22. The reflected sound waves 14 are then received by the hydrophones (not shown) located along the seismic streamers which, when processed, can be used to provide a visual representation (2D, 3D) of the substrata.

Typical seismic traces of the reflections (amplitudes) are shown in FIG. 2. The data shown in FIG. 2 has been migrated ("poststack"), i.e. the amplitudes of the traces are moved to their true subsurface position (depth) to eliminate any offset between the source and receiver. Thus, the poststack seismic reflectivity data comprises of a processed acoustic record of subsurface reflections occurring at many different points within the earth's subsurface. In the field of oil and gas exploration and production, specially trained geoscientists would then interpret images of this poststack data in order to develop a model of the subsurface mapping geological features based on the shape and extent of the reflectors within the dataset.

However, seismic horizon interpretation of 3D seismic data is a challenging and time consuming problem including, for example, associating for each trace the seismic event that belongs to a particular horizon. A number of automated approaches exist to track, for example, a horizon based on user selected amplitude and phase. These seed-based auto-tracking methods propagate through seismic data by vertically matching trace signature information (i.e. extrema) from one or more seeds to the extrema of adjacent traces within a limited time window.

Different seed-based auto-tracking propagation methods may include conventional line-by-line trace selection, first-in-first out (FIFO), and best match criteria. In complex data, the existence of faults, doublets or noise, and the method of trace traversal, can generate horizons that are significantly different. This is because lateral continuity is largely ignored, therefore resulting in jumps across phase cycles. Consequently, a number of global approaches have been proposed that consider the lateral continuity during automated 3D tracking.

For example, Edo Hoekstra in US publication US20110307178A1, "Segment identification and classification using horizon structure," describes a process to automatically define horizon patches from seismic and/or attribute data. Each horizon patch is formed by determining the probability of each point belonging to a defined horizon segment. The probability is calculated by carrying out geometrical calculations.

Pauget Fabien et al, in US patent US2011246157A1, "Method for geologically modelling seismic data by trace correlation," describes a method for developing a geological model by sampling seismic data based on a predetermined gradient and a set of traces, each of which has sample points. By analyzing the similarities between the seismic data around each sampling point, a series of stacked event patches of relative geological age is formed. The connections of each geological age patch are assessed against patches in neighboring stacks. Horizons can then be extracted from a full geological model.

Yingwei Yu et al, in publication "Automatic Horizon Picking in 3D Seismic Data Using Optical Filters and Minimum Spanning Tree," describes a pattern recognition-based horizon-picking method, which uses an orientation vector and a minimum spanning tree to gain more lateral continuity when performing automated 3D horizon tracking.

Purves et al, in GB patent GB2503506B, "Adaptive Horizon tracking," describes an automated 3D tracking method that gains lateral continuity knowledge by calculating the accumulated cost of a horizon propagating through a predefined gated region located forward of the current horizon boundary.

It is fully accepted that 3D auto-tracking is a very useful and powerful tool for capturing events from largely unambiguous data. Interpreters can spend a vast amount of time building up a cognitive understanding of the data, while at the same time, validating the results from 3D auto-tracked horizons to subsequently edit any errors that are caused by the auto-tracking process.

Though, aforementioned approaches try to avoid some of the pit falls of 3D auto-tracking by improving the trace-to-trace lateral awareness and continuity, in more challenging data, interpreters often revert back to more traditional methods of manual or semi-automated 2D tracking. With these traditional methods, every "n" inlines and "m" crosslines that are forming an interpretation grid are interpreted separately. The frequency of inlines and crosslines (i.e. the distance between respective inlines and crosslines) varies depending on the complexity of the data, and it is not uncommon to interpret every 1 to 25 data slices.

Furthermore, the cells within the interpretation grid are generally filled using one of two methods, i.e. (i) simple interpolation or (ii) constrained horizon tracking (within each grid cell). Both methods form a resultant horizon surface. Also, interpolation methods by their very nature do not follow the data, but instead generate new data points within the range of known data points, i.e. the inlines and crosslines. The resulting horizon is accurate at each known data point, but can be inaccurate away from these points. Higher accuracy may be accomplished by increasing the frequency at which inlines and crosslines are manually interpreted. However, this also significantly increases time and effort.

Furthermore, constrained horizon tracking often uses waveform propagation to vertically match trace signature information (i.e. extrema) from one or more seeds to the trace signature information (extrema) of adjacent traces, within a limited time window and between intersecting inlines and crosslines. Due to the lack of global lateral awareness, extrema points can be linked across seismic phase cycles potentially causing inaccuracies in the horizon surface. Though, as with the interpolation method discussed previously, constrained waveform propagation quality may be improved by increasing the frequency of inlines and crosslines.

Still, both methods, i.e. (i) simple interpolation and (ii) constrained horizon tracking, suffer from 3D editing limitations, because in order to correct any horizon surface inaccuracies, the interpreter has to first manually delete any problem areas or regions.

A number of semi-automated 2D tracking algorithms exist to track events on inline- or crossline slices. For example, local amplitudes are correlated between neighboring traces, with the algorithm stopping at faults or other discontinuities.

However, these techniques, to a lesser extent, suffer from the same lateral continuity issues as the previously discussed 3D automated tracking, i.e. propagating any errors made in complex or noisy data.

In order to address the issues mentioned above, Goldner et al., "2D Horizon Tracking using Dynamic Programming," use a graph to calculate an optimal path between two given picks by using a global optimization function to find an event with the highest accumulated similarity value. Accumulated similarity values can be somewhat resistant to noise in data, but may fail to stop at faults, due to lower accumulated values from smaller event segments. This can be somewhat frustrating for interpreters who wish to manually QC (quality check) event jumps at faults.

Furthermore, in complex seismic data, interpreting on 2D planes (either inlines or crosslines) can be challenging, because alternate routes can look equally plausible until they are QC'ed (quality checked) in the other direction.

Accordingly, it is an object of the present invention to provide a method and system suitable to overcome any of the above mentioned disadvantages. In particular, it is an object of the present invention to provide an improved automated tracking method and system that is superiorly adaptable to the seismic data, the geological environment, as well as, any user input.

SUMMARY

Preferred embodiment(s) of the invention seek to overcome one or more of the above disadvantages of the prior art.

According to a first embodiment of the invention there is provided a computer-implemented method for detecting at least one natural contour of a geologic object in 3D seismic data, the method comprising the steps of: (a) receiving at least one first predetermined data set from said 3D seismic data comprising a plurality of phase events; (b) selecting at least one first seed phase event having a first phase characteristic from said plurality of phase events; (c) determine a characterizing score between said selected at least one first seed phase event and each one of a predetermined number of candidate phase events of said at least one first predetermined data set; (d) assigning said characterizing score to each one of said predetermined number of candidate phase events; (e) adjusting said characterizing score of at least one of said predetermined number of candidate phase events in accordance with at least one first boundary condition; (f) determining at least one natural contour between said at least one first seed phase event and at least a second phase event, utilizing an optimization algorithm; (g) generating a visual representation of said at least one natural contour within said at least one first predetermined data set.

The method of the present invention provides the advantage of avoiding the detrimental issues for lateral continuity in both 2D and 3D auto-picking while optionally maintaining the natural fault boundaries, consequently, allowing the interpreter to explore alternate routes for any tracked geological object (e.g. horizon, fault) to further improve his conceptual understanding of the data. Furthermore, the system/method of the present invention comprises a fully integrated 2D/3D interpretation environment allowing the user to pick any phase event on a trace (in either a 2D window or in 3D) to generate both, the route through the selected data, but also any alternate routes through the selected data. Therefore, the present invention provides a method/system for different interpretation practices such as 2D inline/crossline interpretation followed by grid filling, or full 3D auto-tracking with 2D inline/crossline QC (quality check) with significantly improved effectivity, accuracy and ease of use.

Advantageously, said at least one first data set may comprise any one of a 2D inline slice data set, a 2D crossline slice data set, or a 3D volume data set.

Advantageously, said at least one first boundary condition may comprise at least one geologic constraint and/or at least one stratigraphic constraint and/or at least one algorithmic optimization constraint in accordance with at least one variable of said at least one candidate phase event. Preferably, said at least one variable may be any one or any combination of (i) a relative position of said at least one candidate phase event with respect to any other one of said predetermined number of candidate phase events and/or a predetermined geological object, (ii) an angular inclination of said at least one first natural contour with respect to said 3D seismic data, (iii) said characterizing score of said at least one candidate event, and (iv) a characterizing score projected from at least one second predetermined data set from said 3D seismic data.

Even more advantageously, said at least one second predetermined data set may comprise any one of a 2D in-line slice data set, a 2D cross-line slice data set, or a 3D volume data set that is sequentially arranged to respective said at least one first data set within said 3D seismic data.

Preferably, said at least one algorithmic optimization constraint may comprise at least one hard constraint and/or at least one soft constraint.

Advantageously, each one of said predetermined number of candidate phase events may be eligible in accordance with at least one algorithmic condition. Preferably, said algorithmic condition may be a Degree of Freedom (DOF) for movement from one phase event to another.

Advantageously, said first phase characteristic may be any one of a peak-positive amplitude, a trough-negative amplitude or a zero-crossing.

Advantageously, said at least one natural contour in step (f) may include a first natural contour, that is an optimum solution provided by said optimization algorithm, and at least one alternate natural contour, that is an alternate solution provided by said optimization algorithm.

Advantageously, said at least one second phase event may be a second seed phase event selected by the user. Even more advantageously, said step (c) may include determining said characterizing score between said selected at least one first and second seed phase event and each one of said predetermined number of candidate phase events of said at least one first predetermined data set.

Alternatively, said at least one second phase event may be a candidate phase event determined in accordance with its location and/or characterizing score within said at least one first predetermined data set.

Advantageously, step (c) may include utilizing characteristic information from a predetermined number of phase events proximate to respective each one of said predetermined number of candidate phase events.

Advantageously, said characterizing score is a similarity score. Preferably, said similarity score may be based on at least one attribute derivable from said at least one candidate phase events.

Advantageously, when said at least one first data set comprises any one of a 2D in-line slice data set or a 2D cross-line slice data set, said optimization algorithm may be a "Shortest-Path" algorithm.

Additionally, when said at least one first data set comprises a 3D volume data set, said optimization algorithm may be a "Markov Random Field" optimization.

Preferably, said geological object may be any one of at least one horizon feature and at least one fault feature.

According to a second embodiment of the invention there is provided a computer system for detecting at least one natural contour of a geologic object in 3D seismic data by a method according to the first embodiment of the present invention.

According to a third embodiment of the invention there is provided a computer-readable storage medium having embodied thereon a computer program, when executed by a computer processor that is configured to perform the method according to the first embodiment of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE DRAWINGS

The exemplary embodiments of this invention will be described in relation to tracking and interpreting horizons in 2D slices, as well as, 3D seismic data. However, it should be appreciated that, in general, the system and method of this invention will work equally well for tracking and interpreting any other geologic object (e.g. faults).

For purposes of explanation, it should be appreciated that the terms "determine," "calculate," and "compute," and variations thereof, as used herein are used interchangeably and include any type of methodology, process, mathematical operation or technique. The terms "generating" and "adapting" are also used interchangeably describing any type of computer modelling technique for visual representation of a subterranean environment from geological survey data, such as 3D seismic data. In addition, the terms "vertical" and "horizontal" refer to the angular orientation with respect to the surface of the earth, i.e. a seismic data volume is orientated such that "vertical" means substantially perpendicular to the general orientation of the ground surface of the earth (assuming the surface is substantially flat), and "horizontal" means substantially parallel to the general orientation of the ground surface of the earth. In other words, a seismic data volume is therefore in alignment with respect to the surface of the earth so that the top of the seismic volume is towards the surface of the earth and the bottom of the seismic volume is towards the center of the earth. Furthermore, the terms "phase events" and "trace extrema," as well as, "voxels" and "nodes" are used interchangeably.

Figure 1:
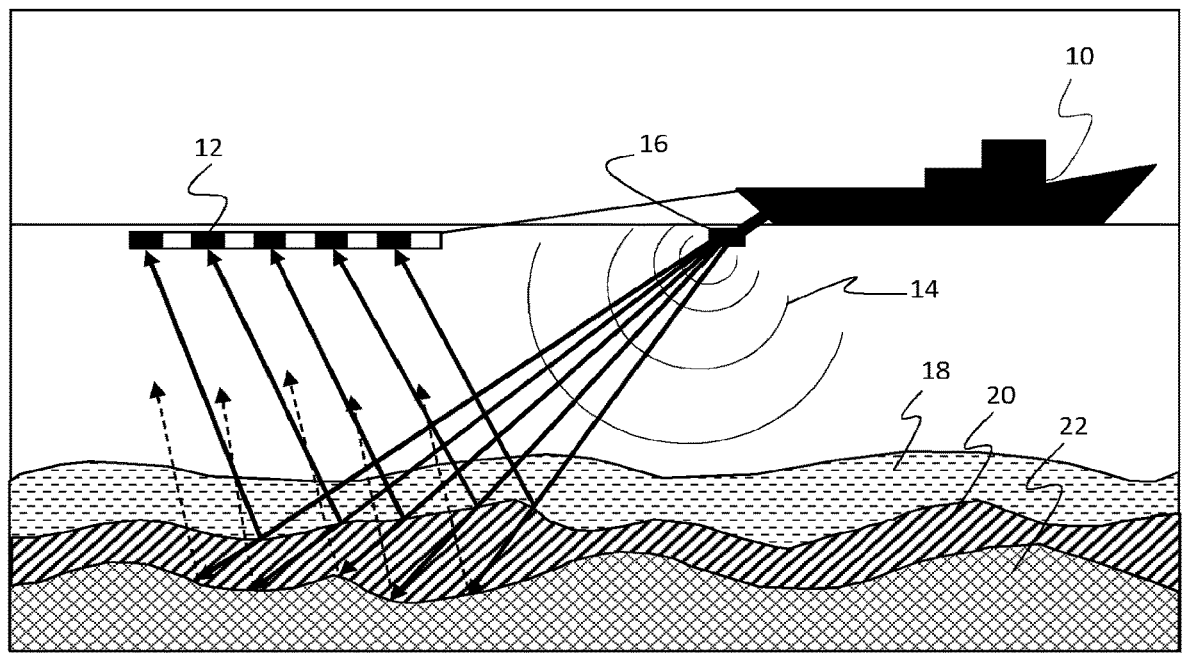
FIG. 1 shows a typical setup for an offshore seismic survey using an array of acoustic receivers (i.e. hydrophones) and sound waves generated by an air gun.
Figure 2:
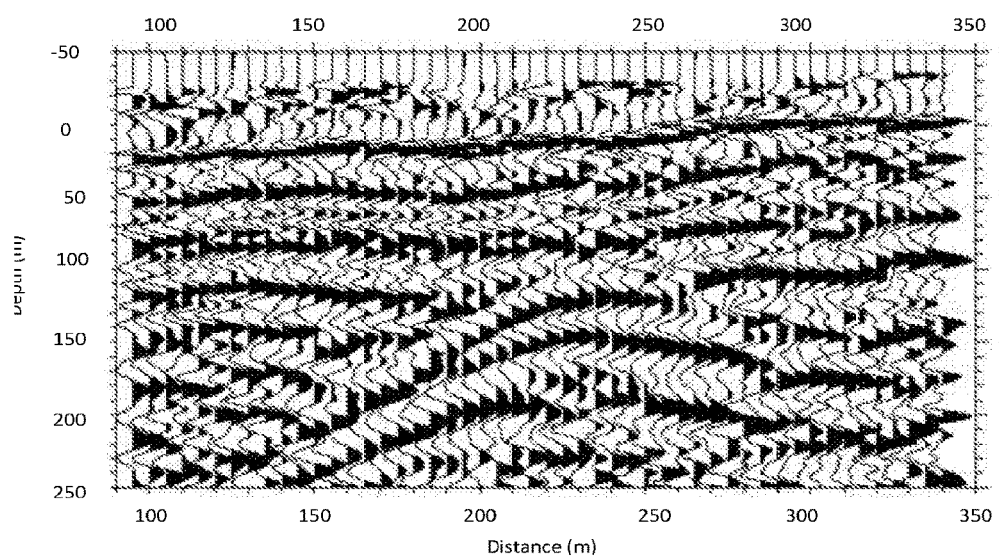
FIG. 2 shows a typical plot of migrated reflection traces recorded by the acoustic receivers after activating the air gun.
Figure 3:
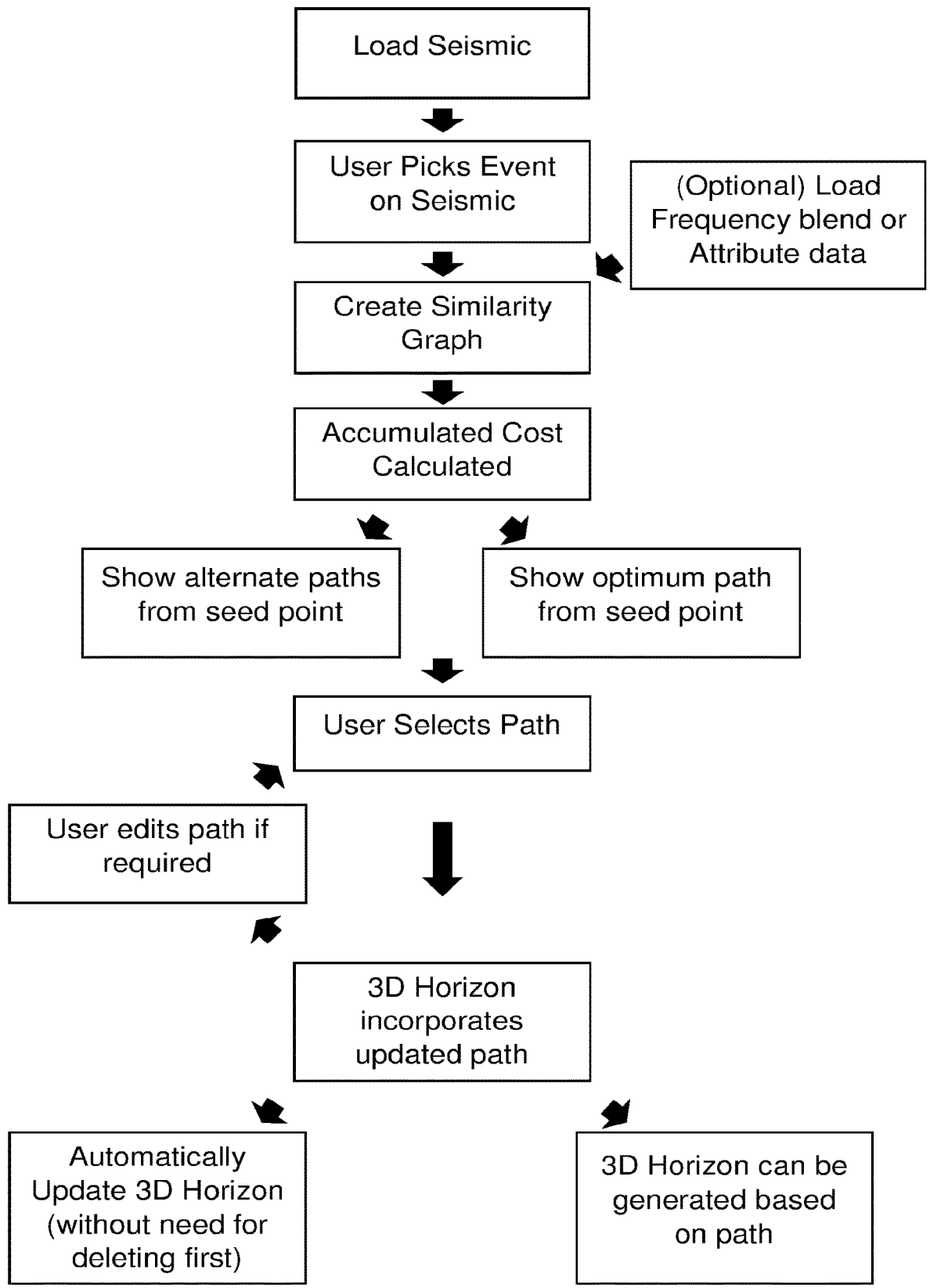
FIG. 3 shows a flowchart illustrating an example workflow of the method of the present invention.

In the preferred embodiment of the present invention, an automated method/system is provided for adaptively and interactively tracking geologic features, such as, for example, horizons and faults, in 3D seismic data. Referring now to the flowchart shown in FIG. 3, the inventive method includes the steps of receiving a predetermined data set from a 3D seismic data 100. The predetermined data set may be 2D slices (e.g. inlines or crosslines) or a 3D data set, each comprising a plurality of phase events (i.e. characteristic events of a seismic trace). A user (e.g. interpreter) picks at least one characteristic phase event as a seed point anywhere within the predetermined data set, and a similarity score is determined and assigned to any applicable one of the other phase events within the predetermined data set 102. An optimization algorithm is then applied to determine the likely contour of the horizon (or fault) starting from the seed point to an endpoint within the predetermined data set. The end point may be a phase event, having phase characteristics and/or a position within the predetermined data set, suitable to provide an optimized path (e.g. optimized cost function) through the predetermined data set, or it may be a second seed point picked by the user. The generated optimum path of the tracked geological feature (e.g. horizon) is that visually presented within the predetermined data set. Optionally, visual representations of alternate (but less optimal) paths may be provided.

Detailed information on each of the method steps and data processing steps, as well as, suitable algorithms used, is provided in the following sections.

2D Inline/Crossline Interpretation. A shortest path algorithm may be used to find an optimum path between two points on a seismic slice. The algorithm includes determining a score (such as similarity) for each reachable voxel (i.e. eligible phase event within the predetermined data set) between the points (i.e. selected seed point and any of the other phase events), and determining a cost of traversing the voxels.

Figure 4:
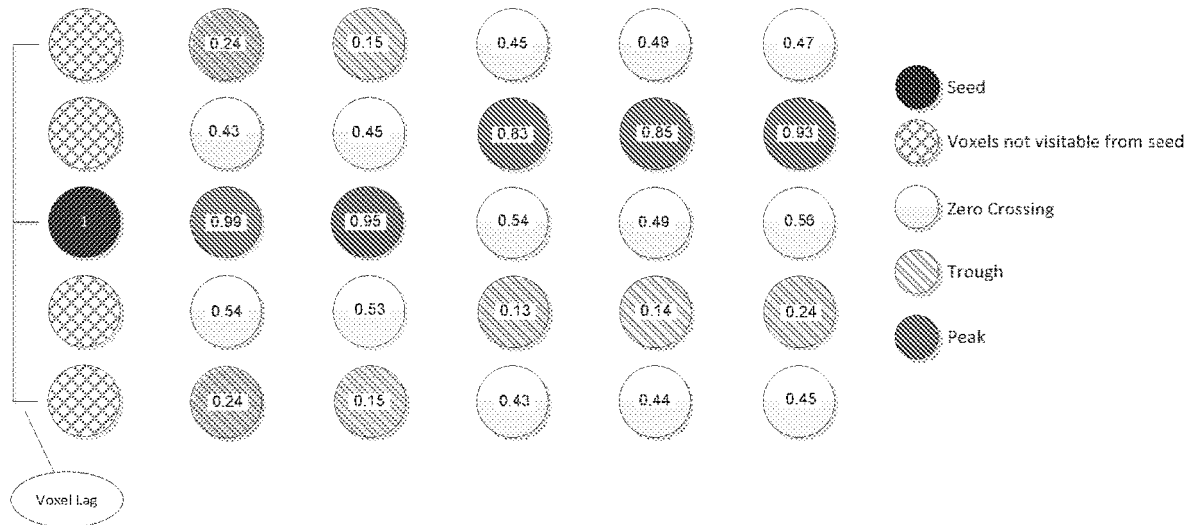
FIG. 4 shows an illustration of phase events (voxels) and "voxel lag," as well as scores between a selected seed and eligible phase events (peaks, zero-crossings, troughs)

Basic Shortest Path Algorithm. Starting with a user-defined pick (representing an event peak, trough or zero crossing) on an inline or crossline slice, a score between the user-defined seed and every reachable voxel (voxels/events within the data slice that may be "reached" from the outgoing seed towards a destination based on initial algorithm constraints and/or a maximum vertical jump) is calculated. From a single seed, the destination point can be "open-ended" (i.e. it is not fixed). This means that the destination point (chosen by the system) may be the end point having the best score in the final trace (at the extent of the slice). For example, as shown in FIG. 4, a seed may be picked on a peak event and similarity scores are determined within a two-voxel vertical lag.

Figure 5:
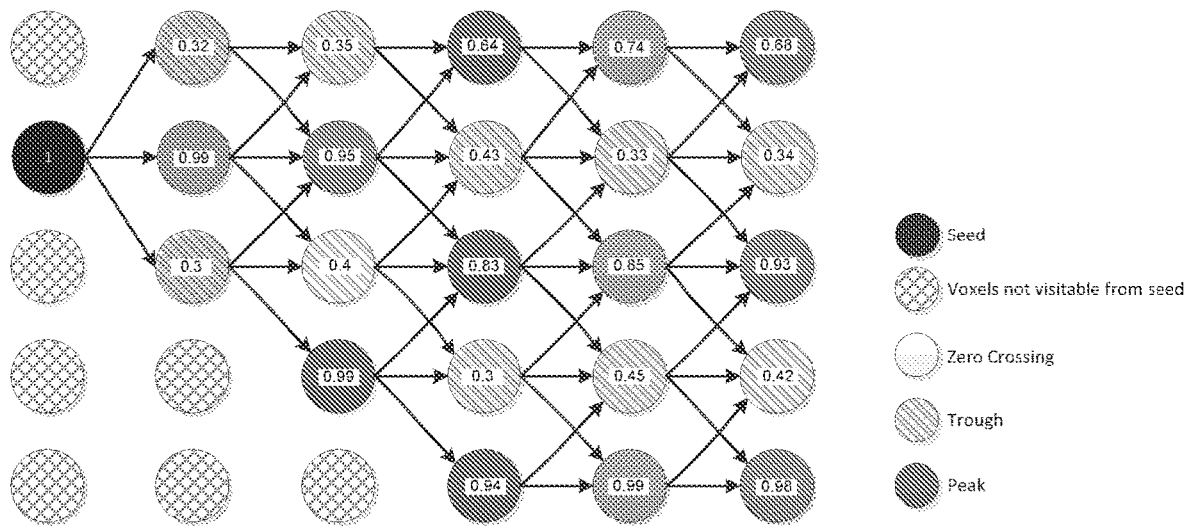
FIG. 5 shows an illustration of phase events without the zero-crossing phase events, including similarity scores between the seed phase event and all other eligible phase events, as well as, the freedom of movement between the seed phase event and all other eligible phase events (arrows)

The score used in this example is a measure of similarity between the seed point and the other eligible voxels. However, it is understood by the person skilled in the art that other suitable phase event characteristics may be used to provide a score. The score is then used to calculate a cost of traversing between the voxels (e.g. from the picked seed point to the end point). The preferred maximum vertical lag between traces is five voxels, although, there is no intrinsic limit. In this particular example, the depicted path traversal is limited to a lag of one voxel and does not display the zero-crossings, so as to simplify illustration as shown in FIG. 5.

When constructing the accumulated cost/score graph, various alternate paths are evaluated, wherein traversal nodes are restricted to only those that can (a) be reached from the starting seed point and (b) reach the end point (e.g. second seed), so that a path between the starting seed point and the end point is guaranteed.

Figure 6:
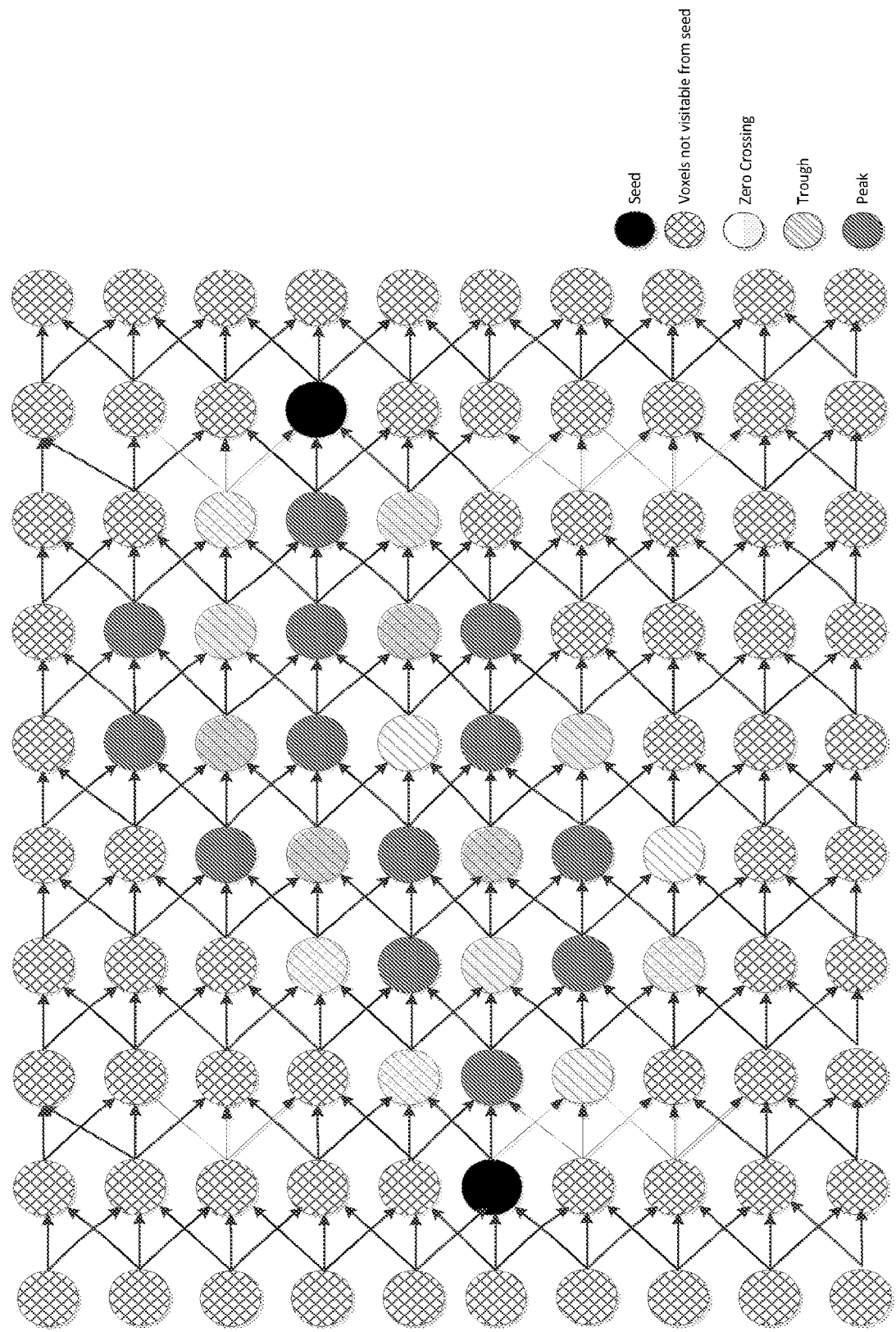
FIG. 6 shows another illustration of phase events (without zero-crossing), where two seed phase events are selected by the user forming a parallelogram of possible paths between the two seed phase events.

For example, when using only one seed point, the graph forms a cone moving outward from that starting seed point. However, when an end point is picked, the forward moving cone is essentially intersected by a cone moving from the picked end point in the opposite direction, resulting in a parallelogram of possible paths. FIG. 6 illustrates such a scenario.

Figure 7:
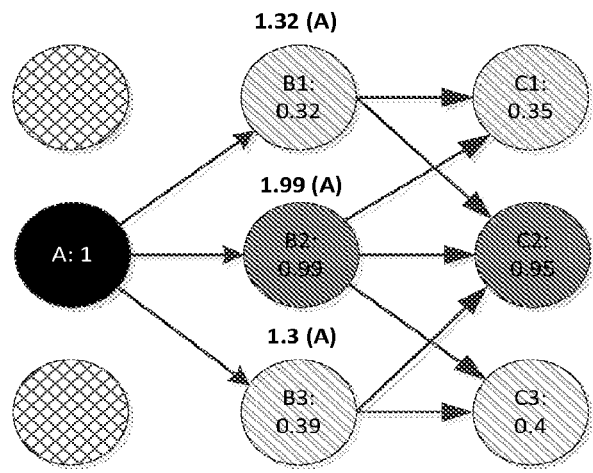
FIG. 7 shows an illustration of how the accumulated score is calculated, (a) starting from the seed phase event adding the score of the eligible phase events, (b) subsequent traversal from the phase event with the highest accumulated score to the next eligible phase event, and (c) traversing back from any phase event via the optimum path.
Figure 7:
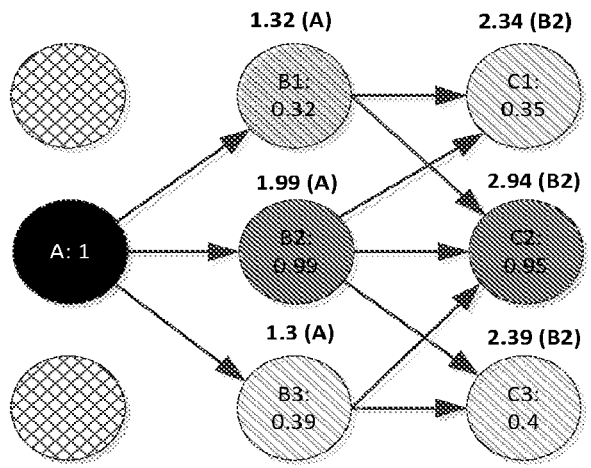
Figure 7:
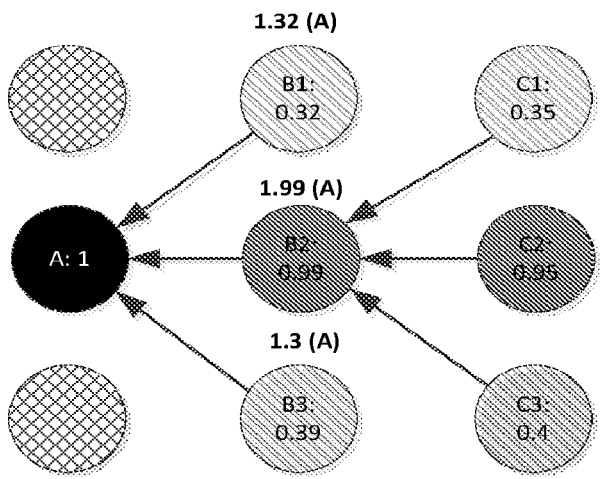

Furthermore, and as shown in FIGS. 7 (a), (b) and (c), alternate paths through the data are determined by calculating an accumulated score and recording the preferred routes. Starting from the seed point (e.g. node A in FIG. 5(a)), the score of the seed point is added to the score of all its traversal accessible voxels (i.e. nodes B1, B2, and B3 in FIG. 5(a)) and the parent score is recorded. Subsequent traversal points (e.g. C1, C2, C3) record the parent score from the node with the highest accumulated score (e.g. B2), which in turn gets added to its own score (C1, C2, and C3 in FIG. 5(b)).

Because the parent score is the score recorded for the incoming node with the best accumulated score, by the time the traversal reaches the end point, the optimum path is already constructed. This concept is illustrated in FIG. 5(c), where the return path is plotted from any node back towards the original seed point.

Figure 8:
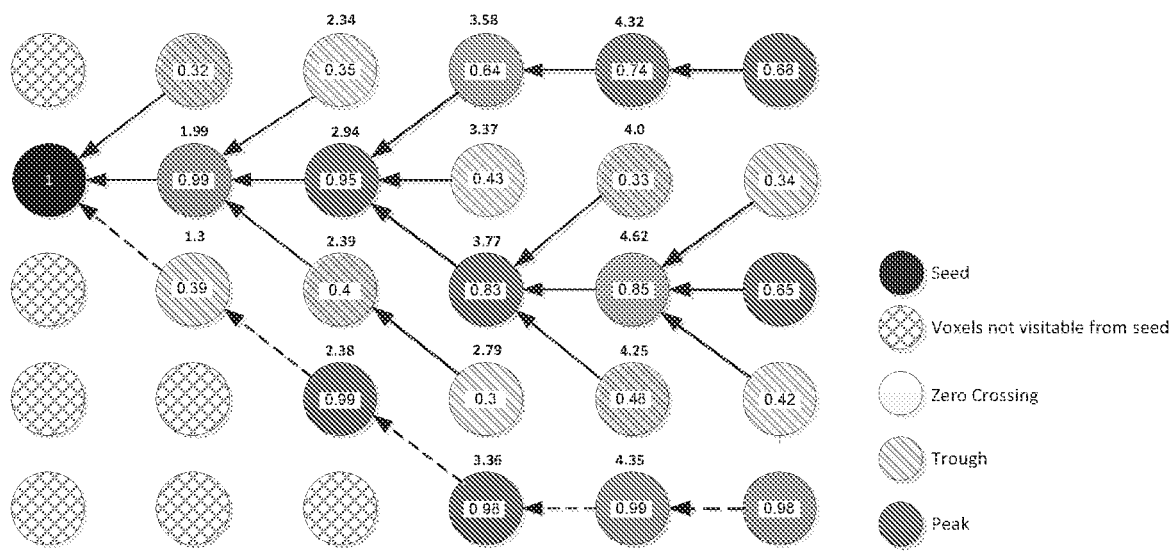
FIG. 8 shows an illustration of the path through the phase events with the best accumulated score.

In the case that the end point is not fixed (i.e. picked by the user), the algorithm is adapted to scan along the final trace (i.e. the last trace within the predetermined data set) and determine the most suitable end point (i.e. the end point with the best accumulated score). An example with a non-fixed end point is illustrated in FIG. 8. Here, the bottom node of the last trace has the largest score (i.e. "0.98") within that trace. The route is plotted from that node to each respective parent.

It is understood that finding a shortest path in a graph representation of visual data, such as illustrated in FIG. 8, is a well-known approach. However, in order to prevent geologically unfeasible tracking of events in the inherently complex and variable seismic data, additional constraints have to be provided within the tracking method. The constraints may be, for example, angular constraints when tracking through the phase events.

Though, instead of using intrinsic constraints, the present invention instils additional layers of geological knowledge into the scoring process, adapting to the additional information as it becomes available. Such a cybernetic loop ensures that an interpreter's knowledge and expertise is not only captured but utilized, while the interpreter's conceptual model of the presented geology increases. In addition, the adaptive nature of the present invention provides a tracking method that is capable to testing the interpreter's conceptual model by generating alternative solutions that are visualized as proposed alternatives.

The score at each voxel location (i.e. phase event) may be generated utilizing the following components:

- Similarity: The initial score component that measures similarity between the user specified seed(s) and all other "reachable" voxels (eligible phase events).
- Geological Behavior: The desired behavior of a tracked event can be encoded into the score by adjusting the score to reward established geological behavior and discourage infeasible geological behavior.
- Bifurcation QC: If the user wishes to verify or control the choices of a path though faulted regions, the score at these regions can either highlight decision points or be used to stop at decision points.
- Projected Score Enhancement: Here, the method utilizes "knowledge" (i.e. characteristic information) from previous interpretation(s) (e.g. a preceding 2D slice) to "influence" the score of the new interpretation.
- Multi-Dimensional Score: When the user/interpreter, for example, adjusts a tracked event path, or adds a new seed, information relating to how the trace signature changes along that event is captured, creating a multi-dimensional score.

Score: Similarity Measures. Preferably, an n-dimensional probability density function (PDF) is used to calculate the probability that voxels belong to a particular event (e.g. one-dimension to represent a seismic volume or attribute, or three-dimensions to represent three frequency magnitude volumes displayed with an RGB color blend). Advantageously, a PDF is generated from a plurality of traces around the user picked seed point, preferably containing information from one or more attribute volumes (e.g. seismic, attribute and frequency blend data).

Figure 9:
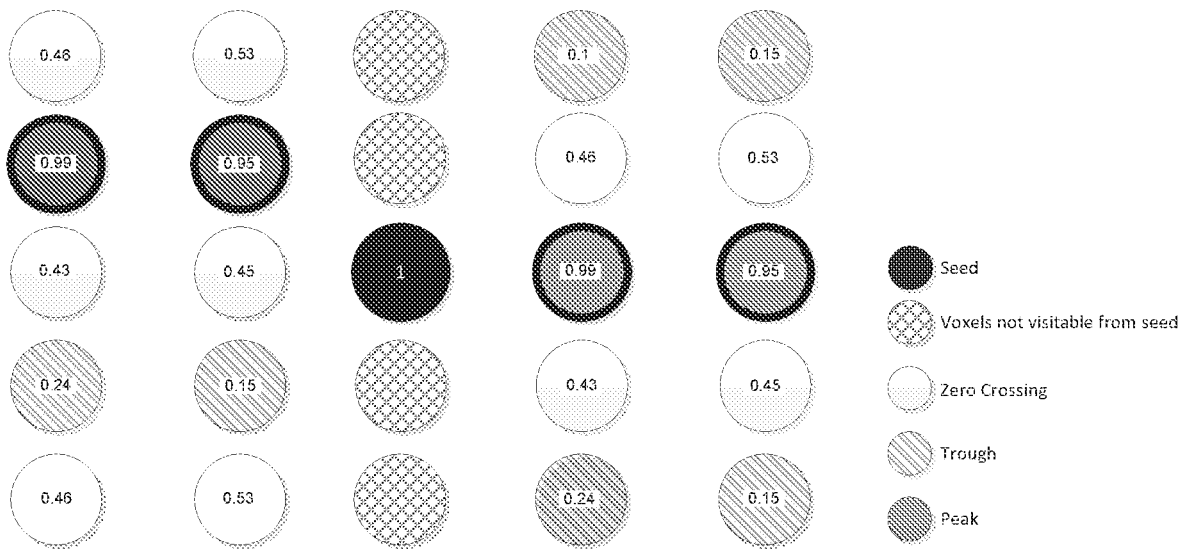
FIG. 9 shows an illustration of using a probability density function (PDF) to calculate the probability that phase events (voxels) belong to a particular event, wherein a number of phase events from around the seed phase event are used.

The use of data from neighboring phase events improves the stability of the results, as well as, reducing the quality dependency on the originally picked seed. For that, and as illustrated in FIG. 9, a simple region growing algorithm may be used to extract, for example, the ten voxels that have the closest amplitude similarity to the picked seed point. The score, which is a probability, is normalized.

Other similarity measures that do not use a PDF may include amplitude or waveform correlation based on seismic data, where the resultant correlation is normalized.

Score: Geological Behavior. To prevent tracking of non-geological horizons, the score may be modified to encourage tracked paths that follow data with the same sign as the originally picked seed point and to discourage phase jumps (e.g. jumps from peak to trough). This may be provided by applying a sigmodal function to the similarity calculation, therefore enhancing the score of nodes with a strong similarity and reducing the score of nodes with weak similarity.

Also, reducing the score of nodes with weak similarity helps to discourage non-geological tracking behavior, such as traversing through a phase change event in order to achieve a higher accumulated score (see for example FIG. 8).

Furthermore, in the preferred embodiment of the present invention, the score is not reduced according to vertical path steepness, although, a preferred limit may optionally be applied so as to discourage steep paths.

Figure 10:
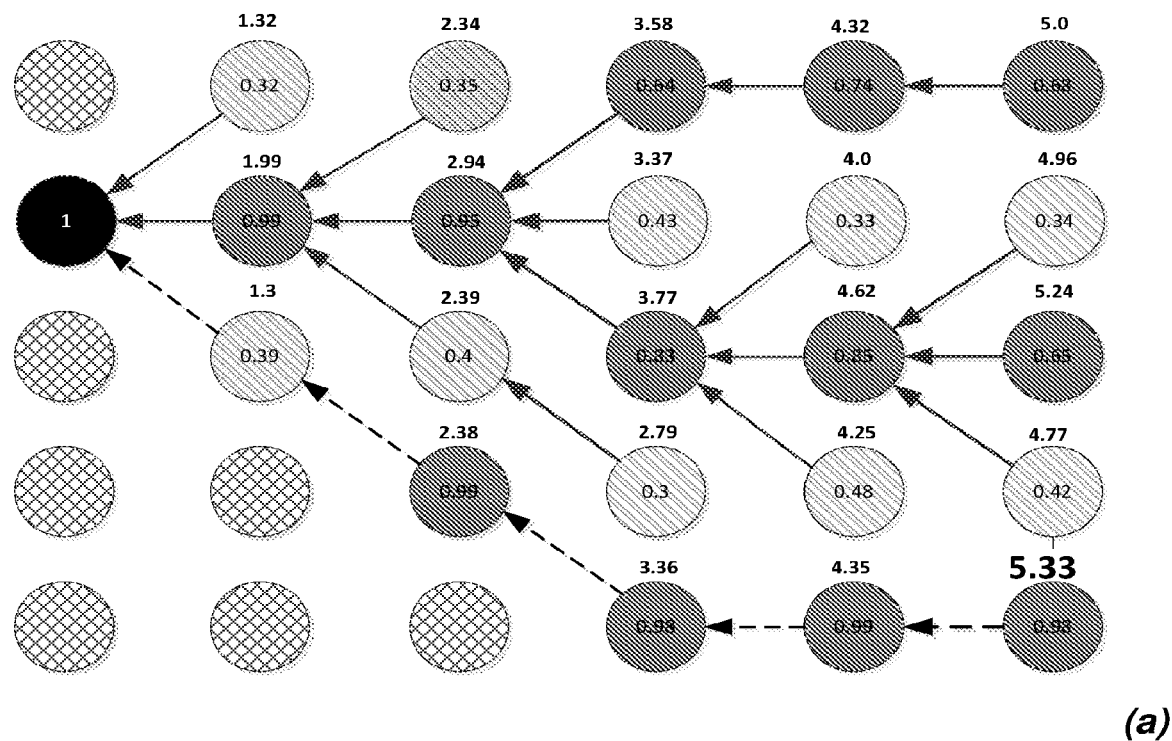
FIG. 10 shows an illustration of a path through the phase events with the best accumulated score (a) before and (b) after score adjustments have been applied.
Figure 10:
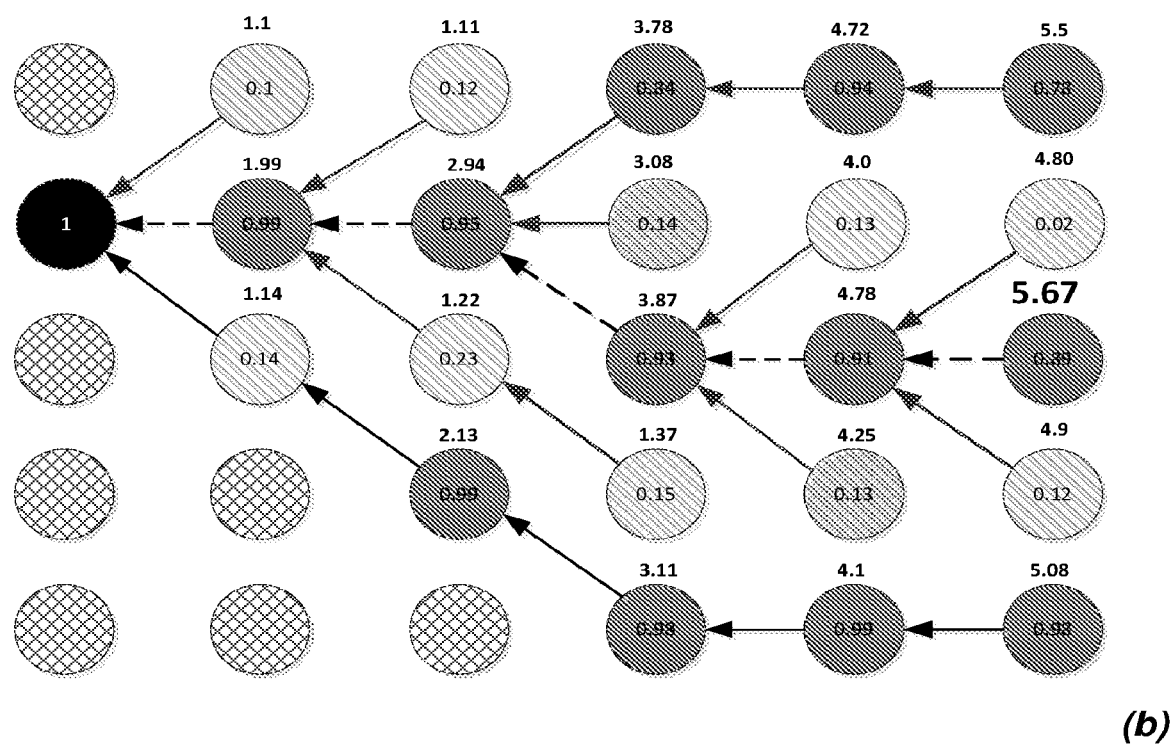

An example of discouraging non-geological tracking is illustrated in FIGS. 10 (a) and (b), where a phase jump tracked in FIG. 10(a) has been prevented by adjusting the score changing the tracked optimum path as shown in FIG. 10(b).

Figure 11:
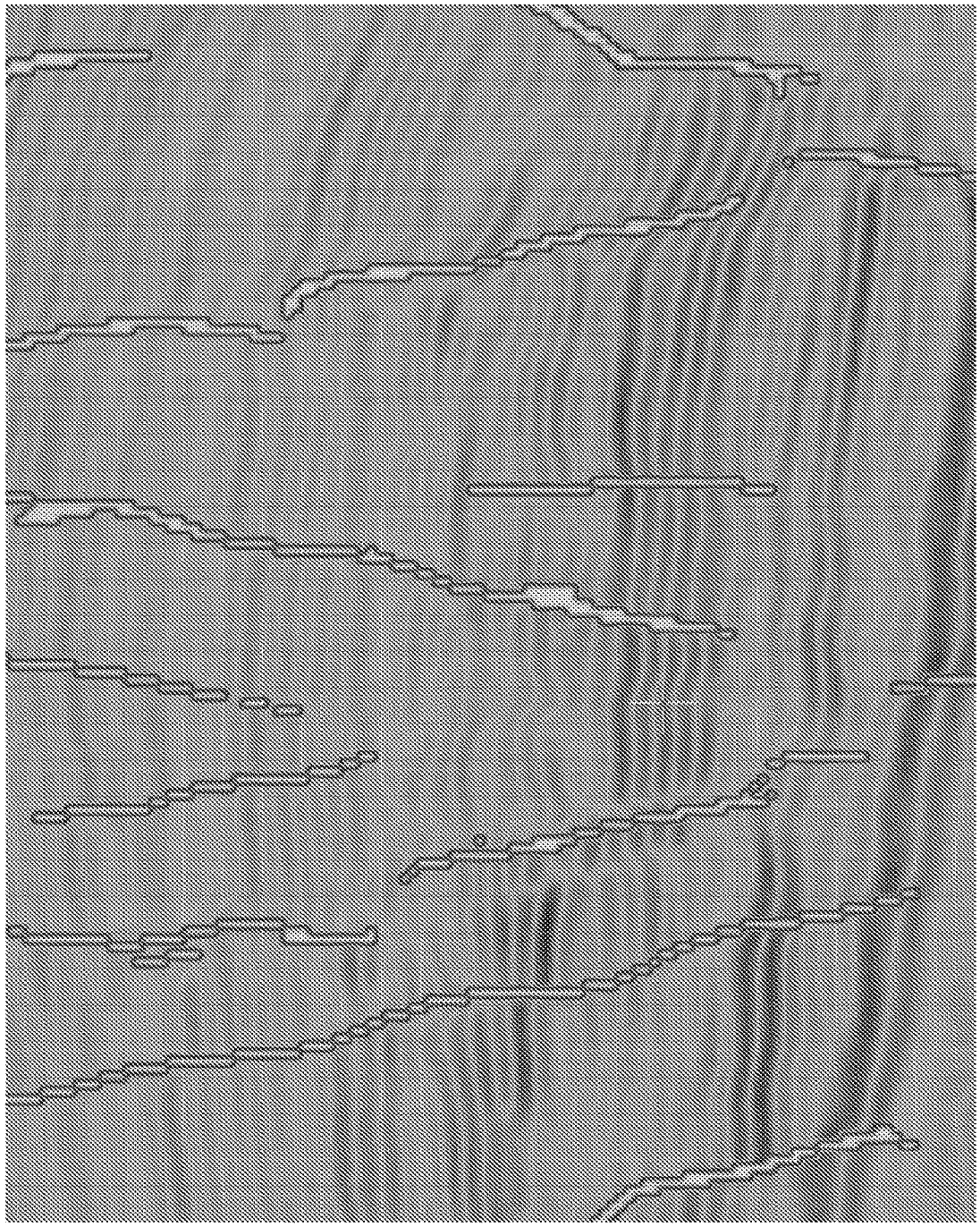
FIG. 11 shows an example 2D trace stack including highlighted faults.

Score: Bifurcation QC (Quality Check). One of the advantages of using score based minimum cost algorithms for horizon tracking is a significantly improved lateral continuity by allowing tracking to bypass natural boundaries, such as faults. However, this feature can also become a disadvantage, in particular, when the interpreter wants a tracked horizon to stop at specific discontinuities. FIG. 11 shows an example of a 2D trace stack including highlighted fault regions.

To encourage a path(s) to stop at faulted regions, penalties may be given to paths crossing faulted regions. In this particular example, a faulted region may be defined by a sudden change of the score (e.g. periods of low score or high costs) over several neighboring traces, a fault attribute, fault stick or fault surface.

Therefore, encoding additional "geologically understanding" into both the local and global decision making could help to (i) intelligently decide whether a discontinuity continues further on, (ii) determine where an event may stop (e.g. where events on-lap, down-lap, etc.), (iii) decide the optimum data to track on either seismic data or frequency blended data, and (iv) provide a global sense of quality.

Such a "geological understanding" may be encoded using a rule-based-system or Deep Learning (DL) and/or Artificial Intelligence (AI) systems. For example, successful tracking behavior through faulted, noisy or chaotic data (or any other data characteristics), is presented to a Deep Learning (DL) or Artificial Intelligence (AI) system, so as to "learn" the desired behavior through such data. Deep Learning and Artificial Intelligence systems are well known in the art of computer modelling and other computer implemented applications, and are therefore not discussed in any more detail.

Score: Projected Score Enhancement. It is common practice that interpreters track inlines and crosslines in sequence, such that multiple inlines will be first interpreted followed by multiple crosslines (or vice versa). The strata between sequential inlines and crosslines change gradually, therefore, a horizon interpreted on one slice will normally not change dramatically on the next subsequent slice.

In order to benefit from the experience and knowledge already instilled in tracked events of previous slices, the score on the currently tracked slice may be influenced from information available on any previous slice, for example, by "boosting" the score values of all phase events at node locations with close proximity of the previously interpreted path.

A projection from the previously tracked phase event may then be displayed on the currently tracked slice together with a suggested new event path. Modifications to existing tracked events may be automatically cascaded to subsequently tracked lines. This is particularly important as the present invention is adapted to automatically update, for example, a 3D surface when an interpreted line is altered by the user.

Figure 12:
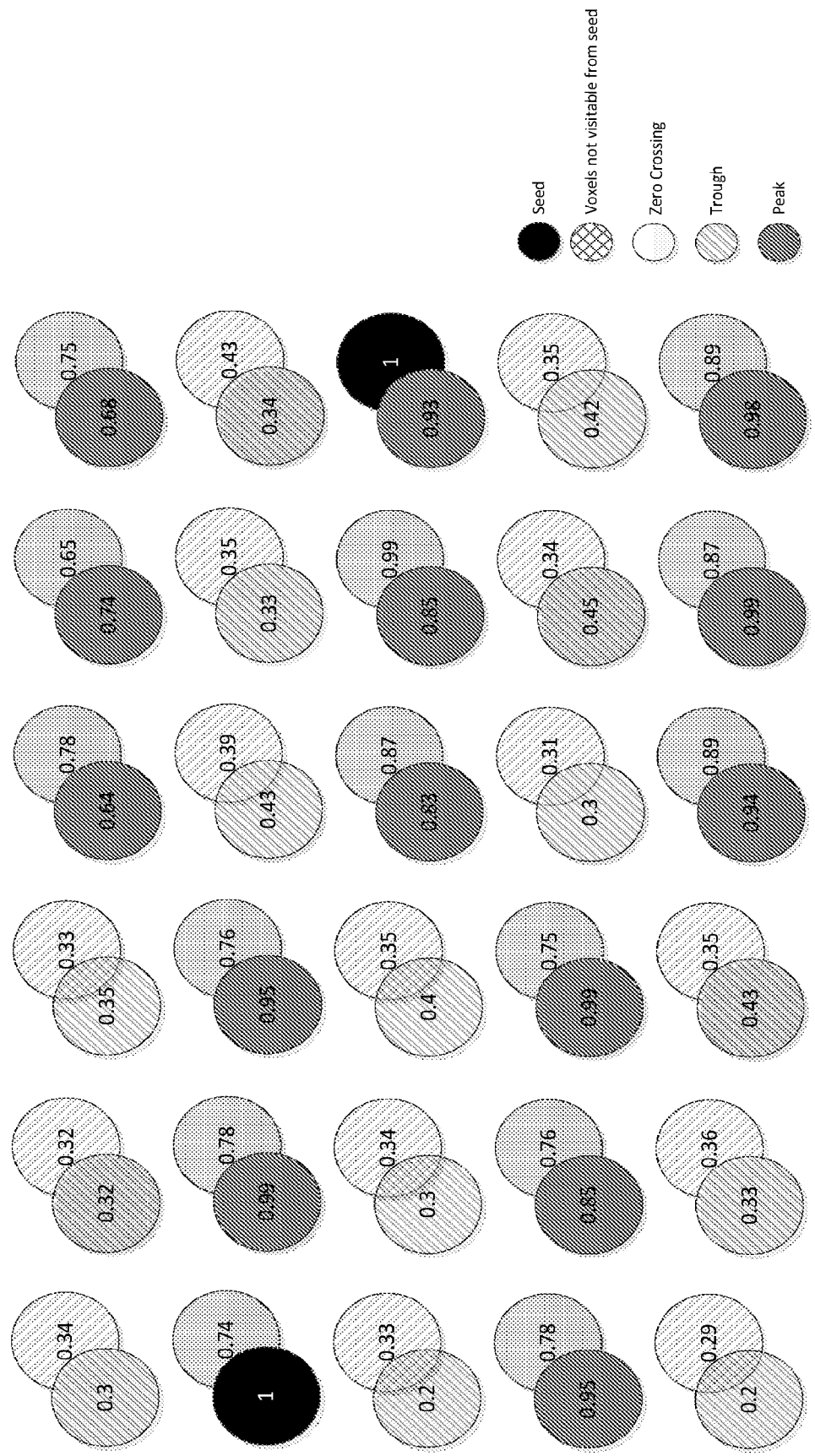
FIG. 12 shows an illustration of multi-dimensional scoring, including scores from two seed phase events ("black," scored "1")

Score: Multi-Dimensional Score. A seismic trace signature that is centered on the phase event of interest may vary significantly over a slice. Consequently, when a user adjusts an event path or adds a new seed point, the information relating to how the trace signature changes along the event is captured and the score is updated. As shown in FIG. 12, a path between two user defined seed points may, in effect, be formed from a multi-dimensional score, in addition to calculating the similarity, adjusting for preferred geological behavior etc., from each picked seed point to each respective "reachable" voxel. The multi-dimensional score may be combined by either calculating the average between the plurality of scores for each phase event (voxel) or taking a maximum value from the plurality of scores for each phase event.

In chaotic areas the user/interpreter may simply wish to "guide" the tracked path and not utilize the trace signature information from that location, so a chaos attribute may optionally be used to automatically exclude seed points that are located in chaotic areas from the multi-dimensional scoring.

Figure 13:
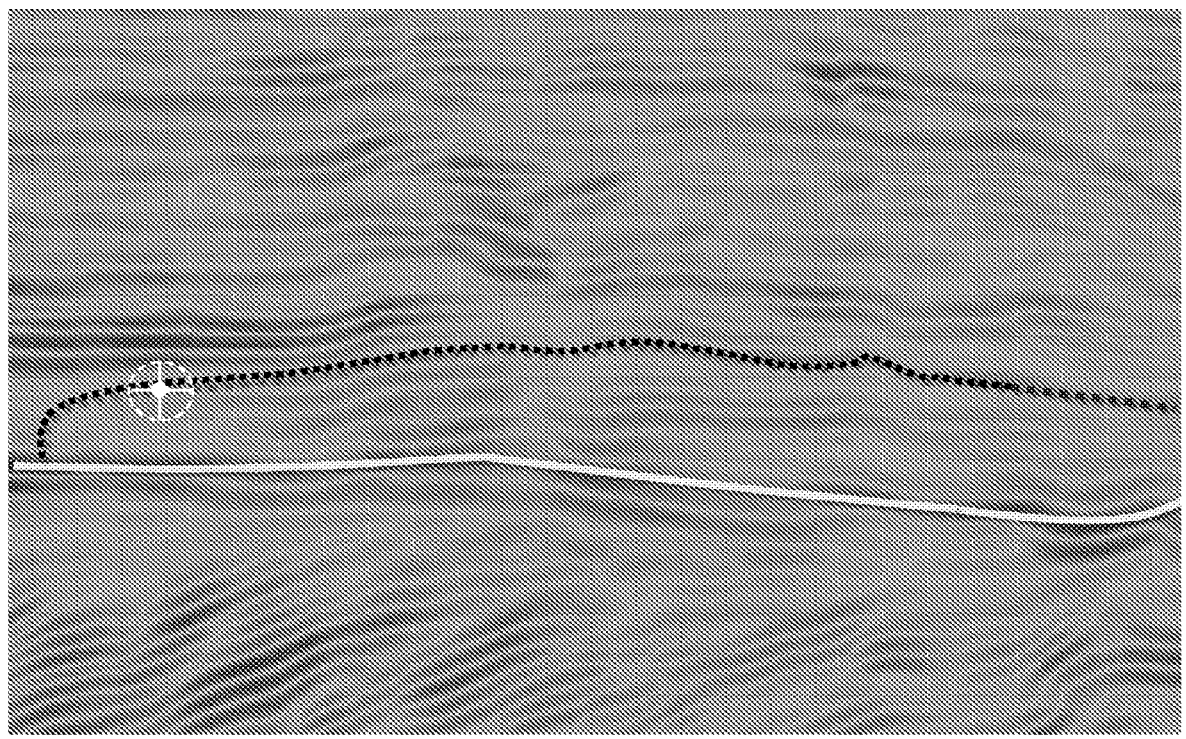
FIG. 13 shows an example 2D trace stack including a tracked horizon ("white" line) and projected previews of interactively altered paths (dotted line)

Interactive Path & Score. One of the advantages of the present invention is that a tracked path is guaranteed to intersect any user defined seed point(s), so the user can explore the effect of altering a route of a tracked path by simply adding additional seed points. As a result, the user is presented with a preview of a new tracked path through that picked seed point that, in essence, acts like a temporary seed point (for example, the temporary seed point may be defined at the location of the user's mouse pointer on the screen, see FIG. 13). The trace signature at the temporary seed point location may also be included in the multi-dimensional score. Therefore, when a user moves the mouse pointer to new locations within the 2D (or 3D) trace stack, it is possible to make an immediate assessment on how a new path might "flow" through the predetermined data.

Figure 14:
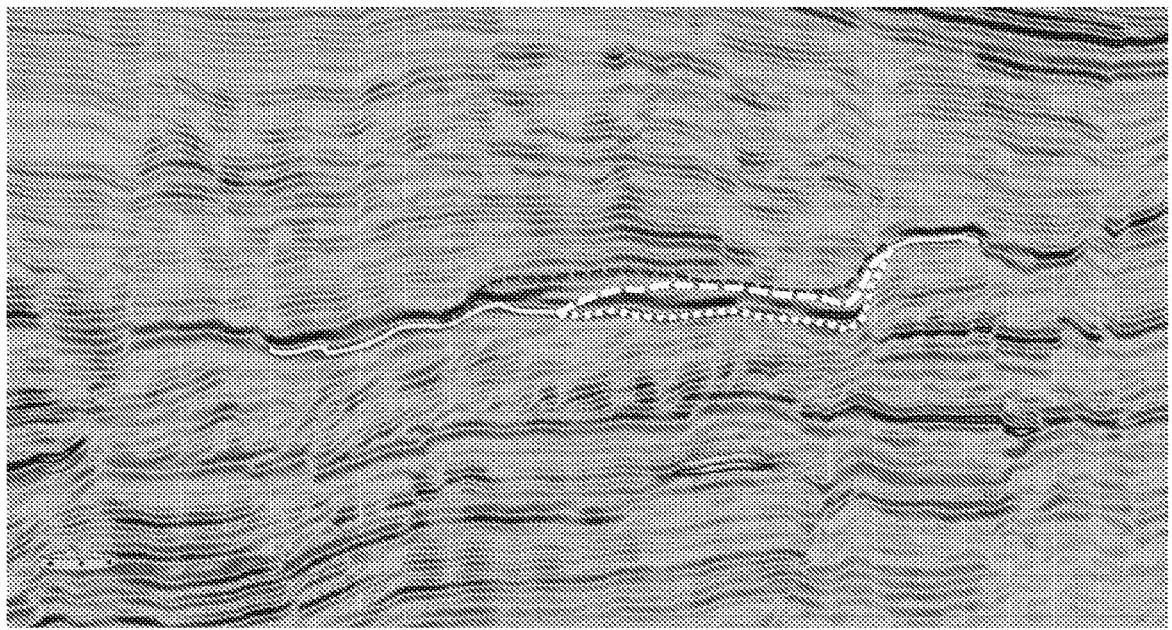
FIG. 14 shows an example 2D trace stack and a tracked horizon ("white" line) as well as, selected alternate routes (respective dotted and dashed "white" and "black" lines)

Alternate Route(s). Referring now to FIG. 14, there may be several routes through the data set where the final accumulated cost is very similar. These alternate routes are optionally presentable to the user, who may or may not select any of the alternate routes.

3D Surface Interpretation. An embodiment of the present invention is capable of tracking natural contours (i.e. surface) of geological features in a 3D seismic trace data set. The auto tracking algorithm of the present invention, therefore, overcomes one or more of the disadvantages of the prior art. Some of the disadvantages present in the prior art are summarized as follows:
  Lateral continuity is largely ignored in first-in-first out (FIFO), and best match region growing, therefore, resulting in jumps across phase cycles;
  Interpolating between inline and crossline grids does not follow the data and requires more frequent interpolation lines in poor data;
  Global approaches are slow to process in 3D data and can still require significant editing in complex data;
  Editing 3D tracked surfaces involves deleting at least a section of that surface;
  Editing 3D tracked surfaces does not provide a projection of where a new surface might end up after tracking;
  Tracked 3D surfaces do not updated automatically when, for example, adjustments are made in 2D slices.

Compared to the prior art, the 3D surface algorithm of the present invention is capable of adapting to additional information made available at any time. I.e. the 3D surface is automatically adapted to any new or edited user defined seed points, or any interpreted 2D lines.

Therefore, the key characterizing features of the 3D surface algorithm of the present invention are:
  the tracked surface is guaranteed to intersect with any interpretation (i.e. single seed points, lines, or bounded regions);
  the tracked surface will update itself without prior user deletion;
  the proportion of the tracked surface that is automatically updated is calculated dynamically;
  the tracked surface does not suffer from lateral continuity issues;
  editing any point of the tracked surface will prompt a preview of the proposed new tracked surface;
  compared to interpolation, fewer tracked interpretation 2D lines are required to accurately represent a desired event.

The present invention, therefore, provides a new 3D surface algorithm that extends a 2D graph cut shortest path algorithm into a 3D data set.

3D Filling. When solving the problem of tracking a 3D surface based on growing that surface from one or more seed points (such as with region growing) is subject to the same error propagation concerns that are present in 2D tracking. The problems related to error propagation may be abated by optimizing the score (or minimizing the cost) for a surface yielding a minimal cost path in 2D.

In the prior art, attempts to extend a minimal cost path into 3D space have often been based on linearly combining a series of minimal cost 2D lines. Such prior art approaches include, for example, joining a series of shortest paths from intelligent scissors segmentation. However, any solution based on constructing a surface from a series of 2D lines is certainly not guaranteed to produce the minimal cost surface.

Grady L, for example, suggested using "Minimum-cost Circulation Network Flow" to produce a 3D surface, however, its complexity could prove restrictively slow on bigger seismic datasets where interactive user input and "live" previews are required.

In another example, Ishikawa, "Exact optimization for Markov random fields with convex priors," describes how a graph may be constructed so as to solve the optimization of a subset of "Markov Random Field" (MRF) problems (those with a convex prior function). The approach involves characterizing the problem as a "maximum-flow/minimum-cut" problem, using a graph where the nodes represent the solution/label of each variable and the edges represent variable values (e.g. the convex prior that is evaluated between variables), and where constraints are imposed on potential solutions. Also, each lateral point in a surface may be regarded as a variable and the solution for each variable may be an elevation value.

The (directed) graph is then used to calculate the maximum flow from a source node to a sink node with each edge of the graph having an assigned capacity. Once the maximum flow has been calculated, the minimal cut corresponds to the set of saturated edges in the graph.

In the present invention, the assumption is made that a horizon surface has (at most) only one elevation value at any lateral point, so that the surface itself may be regarded as a MRF with each sampled point connected (laterally) to its neighbors. Such a representation of a horizon surface may then be leveraged to maximize a similarity score (or minimize a cost) associated with an elevation value at each sample point. As a result of simplifying the problem, the computational complexity is reduced subsequently increasing the performance, therefore, allowing for near real-time surface visualization.

Figure 15:
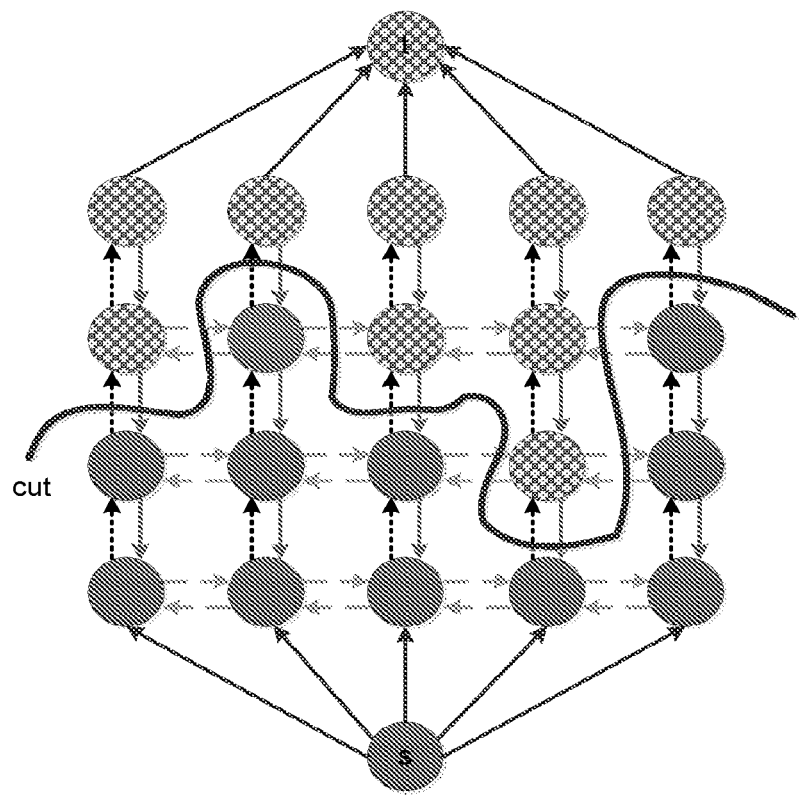
FIG. 15 shows an illustration of a graph theory set-up in 2D data to calculate the shortest path for a 2D horizon line utilizing the "minimum cut"

3D Surface—2D Component. FIG. 15 illustrates a graph set-up for calculating the shortest path for a 2D horizon line by calculating the minimal cut. In particular, the graph shows the minimal cut line separating the source node (s) from the sink node (t). Columns of nodes represent each lateral location of a horizon surface line. Vertical edges between rows of nodes represent the elevation values of each sample point. The graph, therefore, depicts a horizon line of five points, each of which has one of three elevation values associated with it. Indexed from an elevation of "0," the cut of the graph shows the horizon line to have the elevation values "1"–"2"–"1"–"0"–"2". The edges in the graph are set to achieve several aims:

First edges (continuous "grey" "down" arrows) are present to ensure that each column is cut only once. By setting first edges to an infinite capacity, they never become saturated and the minimum cut can therefore never cut a first edge (note that cuts are directed from source (s) to sink (t)).

Second edges (dotted "black" "up" arrows) and third edges ("dashed" "grey" "side" arrows) have a capacity set according to horizon similarity scores as calculated for the 2D tracking.

Second edges are assigned a capacity value proportional to the similarity score of the voxel calculated at the corresponding elevation and lateral location of the edge.

Third edges are assigned a capacity value based on the cost/score determined for travelling between the adjacent lateral locations at equal elevation. As vertical jumps in elevation between lateral locations in the surface will correspond with the cutting of multiple third edges, the cost of a vertical jump may be regarded as an accumulation of one or more of the horizontal costs.

Fourth edges (continuous "black" arrows from sink (s)) are present only to facilitate flow through the graph and have infinite capacity.

Figure 16:
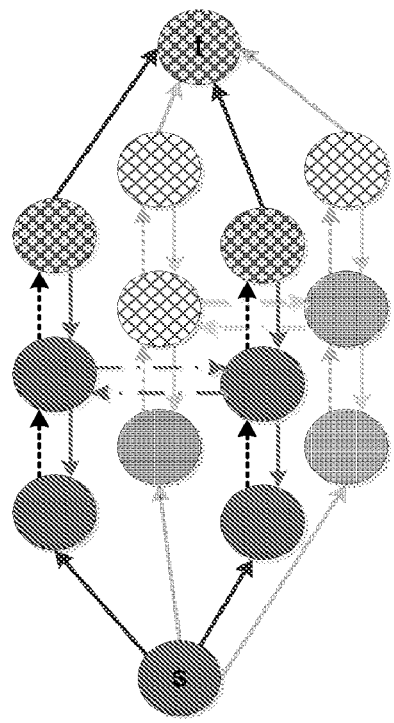
FIG. 16 shows an illustration of a graph theory set-up in 3D data to calculate a minimum surface for a 3D horizon (2×2 in size and a potential of 2× elevation values per phase event)

3D Surface—3D Component. The formulation of the minimal cost horizon surface as a minimum cut graph problem can be trivially extended into 3D. Further layers of nodes may be added to the graph (i.e. for each slice of a volume through which a horizon surface is tracked) and additional edges may be added between adjacent nodes of adjacent layers. FIG. 16 illustrates such an extension into the third dimension for a horizon with 2×2 lateral sample points and with two possible elevation values per sample point.

3D Surface—Preserving Interpretation Points. As with 2D tracking, it is desirable to preserve any sample points (seed phase event(s)) in the horizon surface that have been picked by the interpreter/user. In a preferred embodiment of the invention, any horizon elevation value may be fixed when solving the minimum cut problem, by setting the second edge score of the corresponding location to "0" (so that it is always saturated) and all other second edges of the column to an infinite capacity. Such points are guaranteed to be in the solution and will also be factored into the optimization.

3D Surface—Dynamic Editing. When editing a 3D horizon surface, three steps are generally involved. Firstly, the section of the surface that would be affected by the edits the user wants to make is deleted. Secondly, inline/crossline 2D interpretation lines (or adding additional seeds) are edited. Thirdly, apply auto-tracking/interpolation to grow/fill the deleted surface section.

The present invention allows the user to edit "his own" inline/crossline interpretation, while the surface that passes through their interpretation is dynamically updated, so prior surface deletion is not required. Furthermore, the dynamic surface edit of the present invention guarantees that a new surface includes newly edited interpretation lines (see subsection "Preserving Interpretation Points"), and calculates the extent of the surface that should update.

Figure 17:
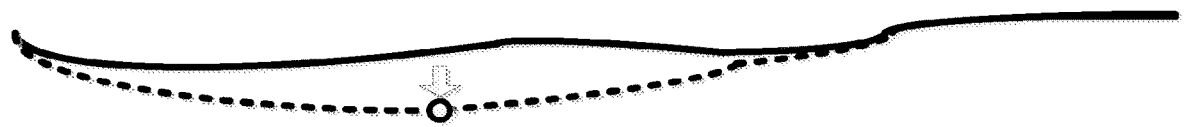
FIG. 17 shows an illustration of an interpreted line and its projected path through a "new" seed phase event using a cost function.
Figure 18:
FIG. 18 shows an illustration of a projected line from a "new" seed phase event to peak points on the "new" interpreted line.
Figure 19:
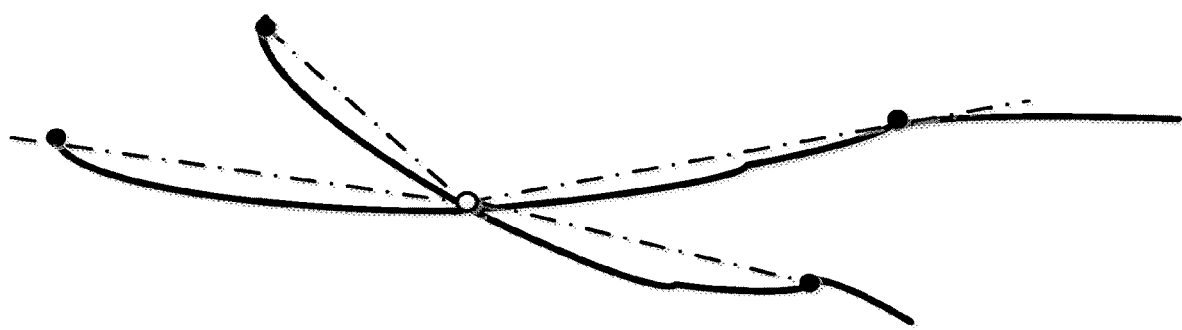
FIG. 19 shows a projected line from the "new" seed phase event to peak points on the "new" interpreted line in both, inline and crossline directions.

In addition, the present invention provides a new "line-of-sight" method to determine, how much surface requires updating based on interpretation edits. For example, if an inline/crossline has been edited (see FIG. 17) so that a new point has been placed on a different event, a line is projected from the dragged point's new location, stopping at the furthest visible point on the line, as seen by the dragged point's new location. The peak points then determine the extent of the surface which requires updating. The surface outside of the peak points are not affected by the user interpretation edits. FIG. 18 shows a projected line from the new seed point to peak points on the new interpreted line. FIG. 19 shows a projected line from the new seed point to peak points on the new interpreted line in both, inline and crossline, directions.

Figure 20:
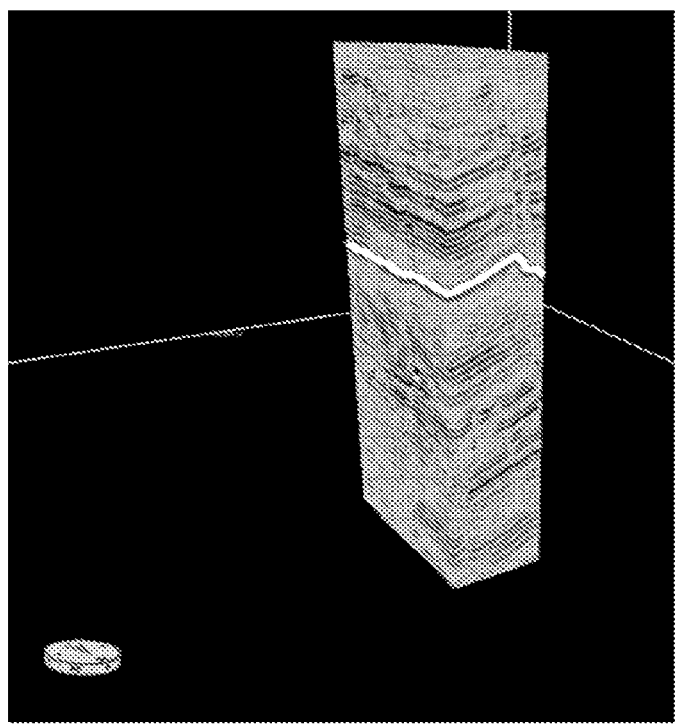
FIG. 20 shows an example 3D trace stack (a) in its 3D shape with a wrapped tracked line ("white" line), and (b) when unfolded ("white" line)
Figure 20:
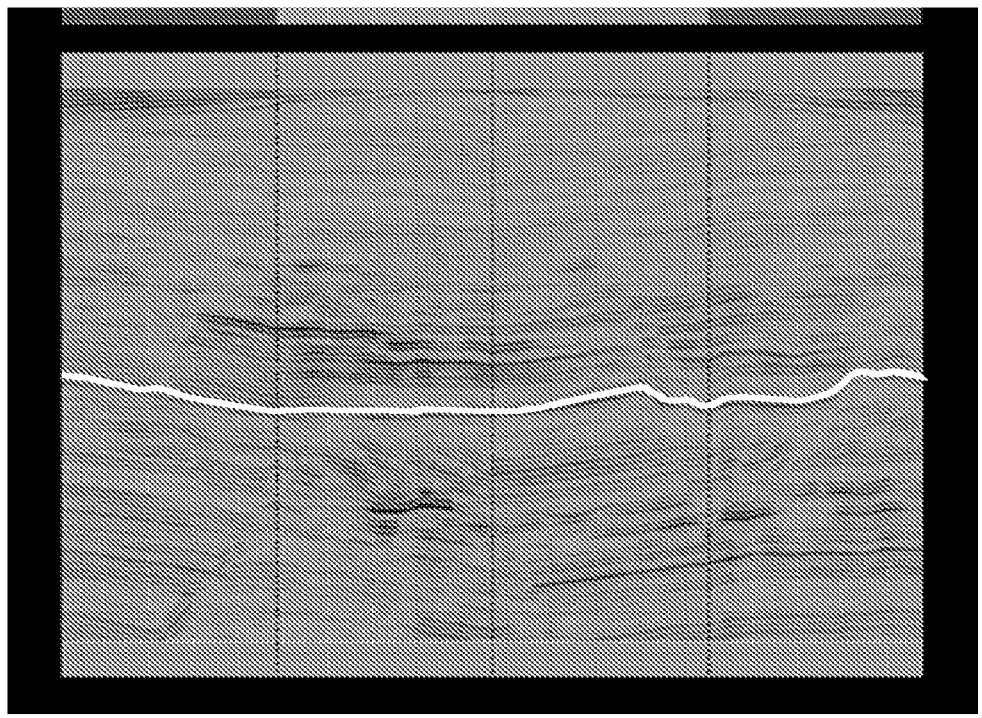

3D Surface—Wrapped Tracking & Filling. The present invention provides a method of wrapped 2D shortest path tracking that allows a user to pick a seed point on either a 3D probe or an unwrapped slice view of the 3D probe, i.e. a slice showing the probes two inline and two crossline sides (see FIGS. 20(a) and (b)).

The wrapped 2D shortest path tracking guarantees that the tracked line starts and ends at the initial seed point and that the 3D probe corner points (unwrapped slice corner points) match. All of the interactive features described for the 2D Inline/Crossline Interpretation also apply to the wrapped tracking. In particular, the wrapped tracking may be used to constrain the surface fill for one or more regions, either using traditional horizon region growing, interpolation or the 3D surface tracking algorithm of the present invention. To summarize:

Wrapped Tracking—Horizon Region Growing: The voxels of the wrapped tracked line become seed points for a region growing algorithm, generating a surface within the tracked line perimeter.

Wrapped Tracking—Interpolation: A surface interpolation algorithm is performed between the wrapped tracked line's perimeter.

Wrapped Tracking—Proposed Surface Tracking: The tracked wrapped line forms both a constraint for the surface tracking algorithm, as well as, guaranteed points of intersection with the surface.

Figure 21:
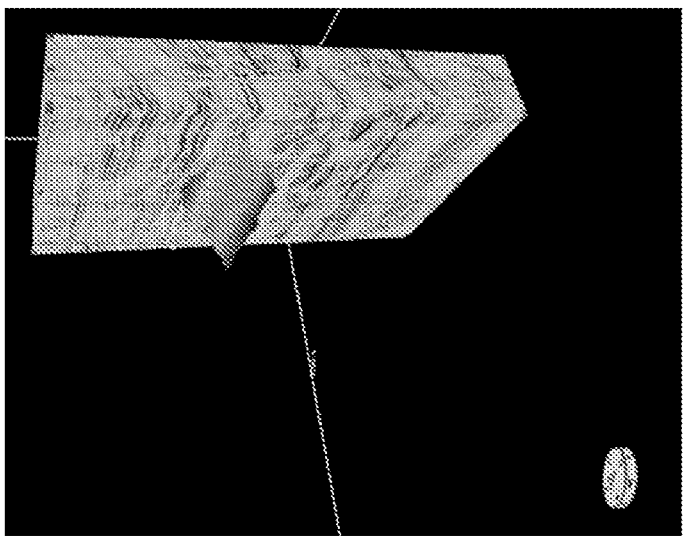
FIG. 21 shows another example 3D trace stack (a) with a wrapped tracked line, (b) the wrapped tracked line extracted, and (c) the surface generated within the wrapped tracked line constraints.
Figure 21:
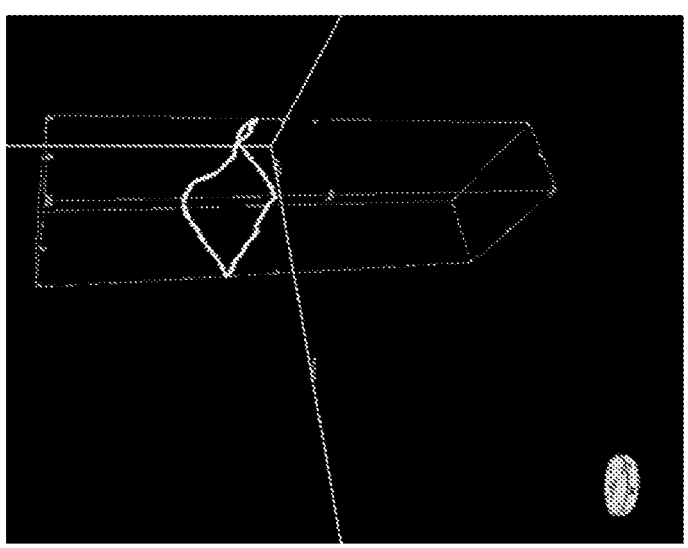
Figure 21:
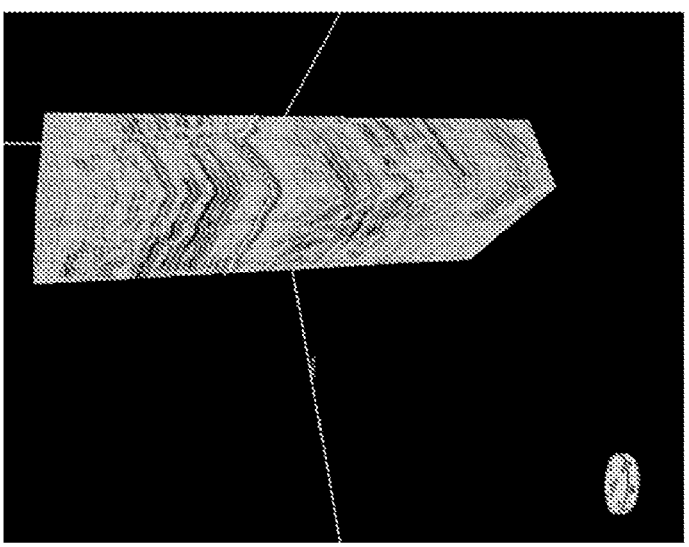
Figure 22:
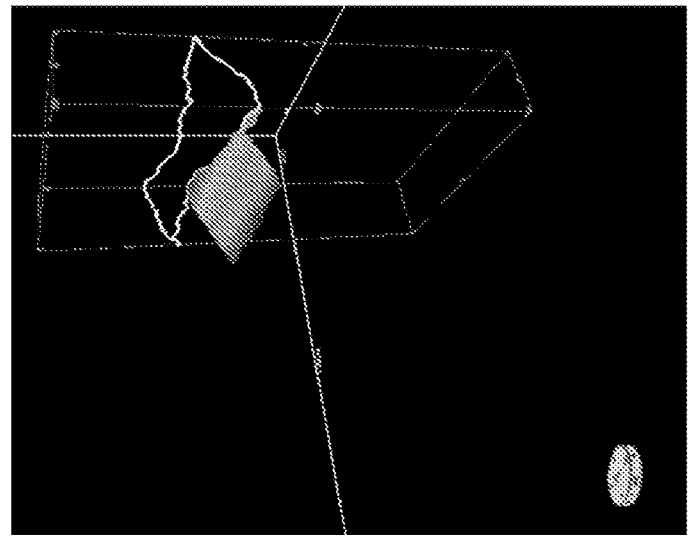
FIG. 22 shows another example 3D trace stack (a) including a wrapped tracked line and projecting surface fill, and (b) the extracted wrapped tracked line with projected surface fill.
Figure 22:
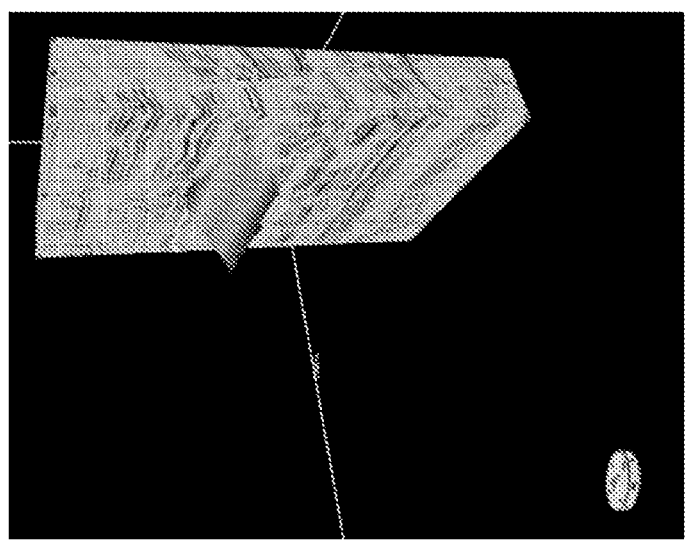
Figure 23:
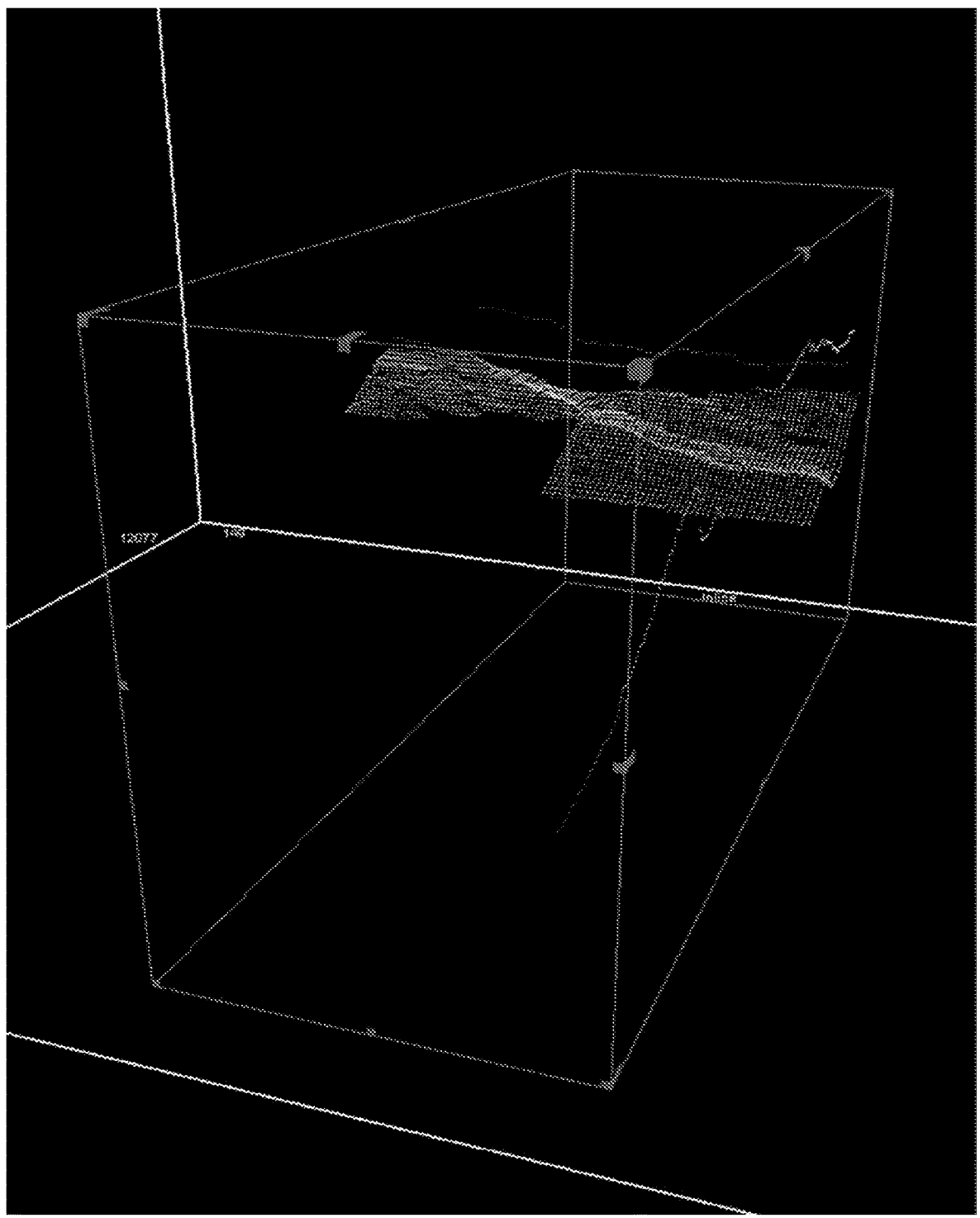
FIG. 23 shows another example of a fault surface tracked and visualized within a 3D seismic data set.

As shown in FIGS. 21(a), (b) and (c) and FIGS. 22(a) and (b), an interpretation grid may be generated by wrapped tracking on a series of joined or intersecting 3D probes/unfolded probes. Also, in addition to wrapped tracking line constraints, all of the above surface filling techniques may be used with grids defined by intersecting inline and crossline slice interpretations, which may or may not intersect with wrapped tracked lines (see FIGS. 22(a) and (b)).

Fault Tracking. It is understood by the person skilled in the art that the present invention may be used for tracking any geological feature, such as, for example, horizons and faults.

Seismic faults may help trapping hydrocarbons, but they may also cause complications during field production due to fragmented reservoirs. Consequently, interpreters attempt to understand migration pathways from the source to the reservoir by mapping faults and fault networks. Therefore, as is with horizon tracking, fault interpretation remains a consuming aspect of 3D seismic interpretation, where faults are often picked manually as discontinuities in seismic amplitude or fault attributes data (such as coherency) volumes. Also, the effectiveness of automatic fault detection greatly depends on the type of seismic data, i.e. automated fault interpretations applied to complex or poor quality data may require significant user editing, resulting in a similar effort and time cost to common manual methods. Furthermore, semi-automated methods, i.e. where the interpreter guides the fault extraction, are generally more reliable on seismic data with either high complexity or lower quality.

It is therefore understood by the person skilled in the art, that the present invention is also suitable for adaptively tracking faults within 2D seismic slices, as well as, 3D seismic data volumes. The specific method and system will be in accordance with the embodiment described for tracking horizons.

It will be appreciated by persons skilled in the art that the above embodiments have been described by way of example only and not in any limitative sense, and that various alterations and modifications are possible without departing from the scope of the invention as defined by the appended claims.

The invention claimed is:

1. A computer-implemented method for detecting a natural contour of a geologic object represented in three-dimensional (3D) seismic data, the method comprising:
   identifying a first data set from within the 3D seismic data, the first data set comprising a plurality of phase events;
   selecting, from the plurality of phase events, a first seed phase event comprising a first phase characteristic;
   using a similarity calculation to determine a corresponding similarity score between the selected first seed phase event and each one of a predetermined number of candidate phase events included in the first data set;
   assigning each corresponding similarity score to each corresponding one of the predetermined number of candidate phase events;
   adjusting a particular similarity score of a particular one of the predetermined number of candidate phase events in accordance with a first boundary condition that includes an algorithmic optimization constraint to boost the particular similarity score based on a determined similarity score projected from a second data set that is also included within the 3D seismic data; and
   generating, based on an optimization algorithm, a tracked path corresponding to the natural contour that is present between the first seed phase event and a second phase event.

2. The method of claim 1, further comprising preventing, during generation of the tracked path, the tracked path from tracking non-geological horizons by modifying one or more of the similarity scores of the candidate phase events to discourage the tracked path from jumping between peaks and troughs.

3. The method of claim 2, further comprising discouraging the tracked path from jumping between peaks and troughs by applying a sigmodal function to the similarity calculation used to determine said similarity scores of the candidate phase events, wherein applying the sigmodal function operates to reduce similarity scores of specific candidate phase events that are determined to have a weak similarity relative to the first seed phase event.

4. The method of claim 3, wherein reducing, using the sigmodal function, the similarity scores of the specific candidate phase events that are determined to have the weak similarity relative to the first seed phase event is performed irrespectively of a vertical path steepness existing between the first seed phase event and the specific candidate phase events such that said reducing is not performed based on the vertical path steepness but rather is based on the weak similarity determination.

5. The method of claim 1, further comprising:
   determining, during generation of the tracked path, whether the tracked path has entered an identified chaos area; and
   using, in response to a determination that the tracked path has entered an identified chaos area, a defined chaos attribute to automatically exclude seed phase events that are associated with the identified chaos area from influencing the tracked path such that the tracked path is guided through the chaos area without reliance on said excluded seed phase events.

6. The method of claim 1, further comprising, stopping, during generation of the tracked path and based on an encoded penalty to be applied to tracked paths that cross into fault regions, generation of the tracked path when the tracked path reaches a detected fault region corresponding to a geological fault represented within the 3D seismic data.

7. The method of claim 1, further comprising generating a visual representation of the natural contour using the tracked path.

8. The method of claim 1, wherein the second data set comprises a two-dimensional (2D) in-line slice data set, a 2D cross-line slice data set, or a 3D volume data set that is sequentially arranged respective to the first data set within the 3D seismic data.

9. The method of claim 1, wherein each one of the predetermined number of candidate phase events is eligible in accordance with an algorithmic condition.

10. The method of claim 9, wherein the algorithmic condition is a Degree of Freedom (DOF) for movement from one phase event to another.

11. The method of claim 1, wherein the first phase characteristic is any one of a peak-positive amplitude, a trough-negative amplitude, or a zero-crossing.

12. The method of claim 1, wherein the natural contour includes (i) a first natural contour that is an optimum solution provided by the optimization algorithm and (ii) an alternate natural contour that is an alternate solution provided by the optimization algorithm.

13. The method of claim 1, wherein the second phase event is a second seed phase event selected by a user.

14. The method of claim 13, wherein each candidate phase event included in the predetermined number of candidate phase events is selected for inclusion within the predetermined number of candidate phase events as a result of each candidate phase event being within a maximum jump distance relative to the selected first seed phase event.

15. The method of claim 1, wherein the second phase event is a candidate phase event determined in accordance with its location or similarity score within the first data set.

16. The method of claim 1, further comprising determining the similarity score utilizing characteristic information from a predetermined number of phase events proximate to each respective one of the predetermined number of candidate phase events.

17. The method of claim 1, further comprising determining the similarity score based on an attribute derivable from the particular one candidate phase event.

18. The method of claim 1, further comprising:
utilizing deep learning to develop a geological understanding; and
stopping the tracked path's generation based on the geological understanding.

19. A computer system configured for detecting natural contours of geologic objects by performing the method of claim 1.

20. A non-transitory computer-readable hardware storage device having embodied thereon a computer program that, when executed by a computer processor, is configured to perform the method of claim 1.

* * * * *